Figure 1:
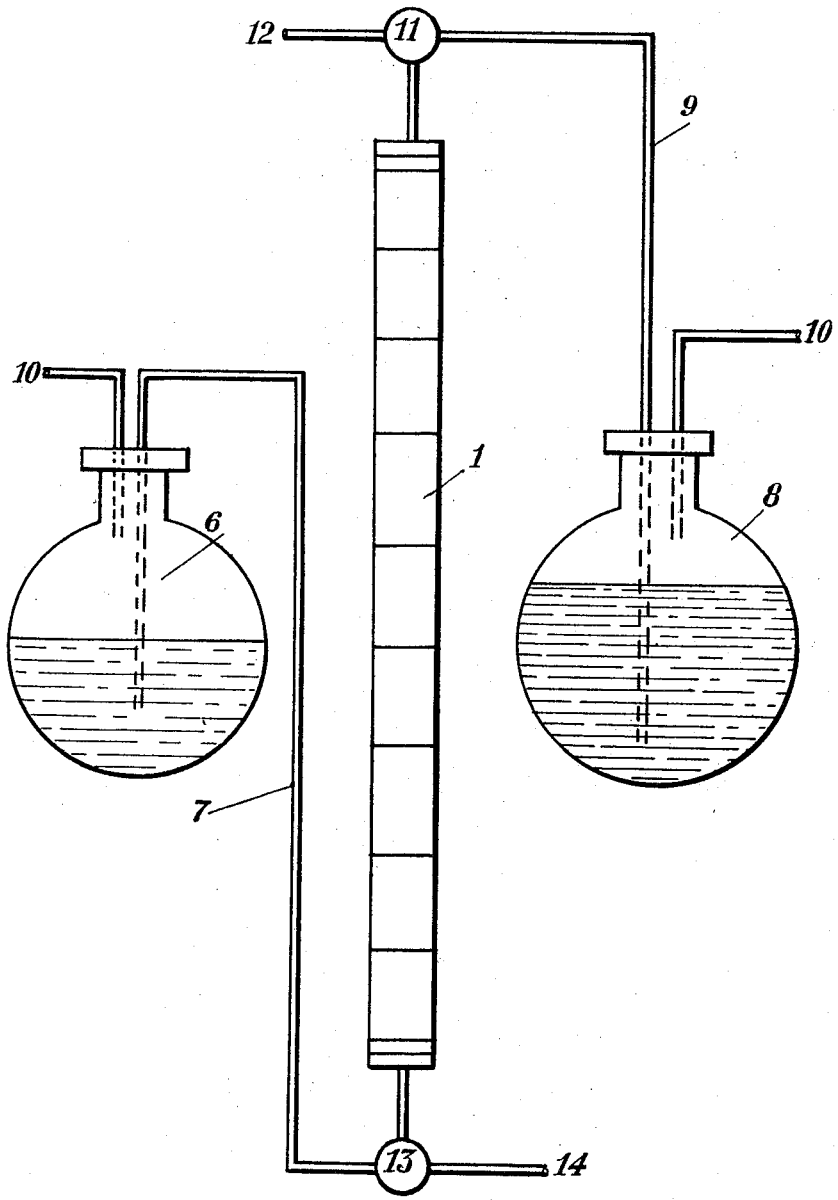

Nov. 26, 1957 A. KEPES 2,814,553
APPARATUS FOR EXTRACTION OR FRACTIONATION OF VARIOUS SOLUTES
Filed May 26, 1953 3 Sheets-Sheet 2

INVENTOR
ADAM KEPES
BY
Bailey, Stephens & Huettig
ATTORNEYS

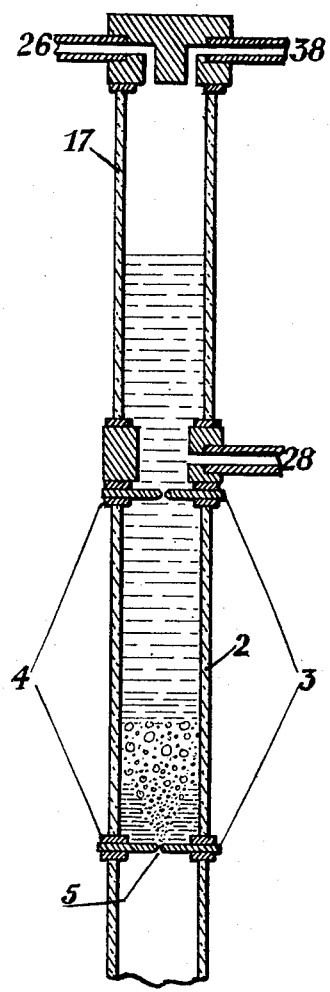
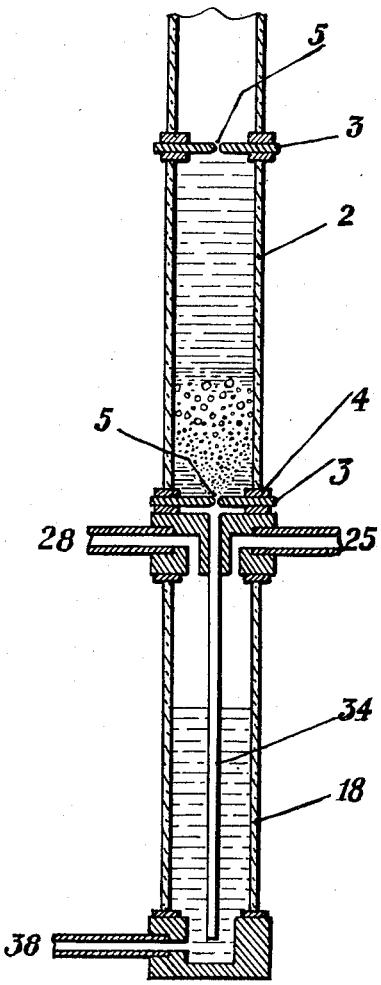

United States Patent Office 2,814,553
Patented Nov. 26, 1957

2,814,553

APPARATUS FOR EXTRACTION OR FRACTIONATION OF VARIOUS SOLUTES

Adam Kepes, Paris, France, assignor to Centre National de la Recherche Scientifique, Paris, France, a society of France Application May 26, 1953, Serial No. 357,602

Claims priority, application France May 29, 1952

3 Claims. (Cl. 23—270.5)

Many industrial processes include liquid extraction and many equipments have been designed to operate extraction processes. Discontinuous process equipments with separate mixers and settlers require a pump per feed liquid at each stage and high power input for mixing. Time loss to allow settling is not negligible. Continuous tower equipments have relatively low stage efficiency because of poor dispersal of the disperse phase unless very favorable solvent pairs are used with low interfacial tension. In this last case formation of stable emulsions and flooding are often to be feared. It follows that these processes are seldom used when high selectivity i. e. a high number of theoretical stages are required. In most cases only standard composition end products are obtained and not really pure substances.

Laboratory equipments exist to operate more selective extractions by the counter-current distribution method but they are complicated, fragile and very costly, and for these reasons have not a widespread use.

The object of the present invention is an apparatus consisting in a high number of extraction units; in all of them the mobile liquid phase is simultaneously dispersed in the staionary liquid phase by flowing continuously under pressure through small orifices and settling takes place at the same rate as dispersal in the same containers.

This apparatus is able to perform continuous counter-current extraction with maximum efficiency, continuous counter-current fractional extraction with maximum selectivity, and, in the laboratory field, counter-current distribution in a fairly available equipment.

Every extraction unit of a series is a container entirely filled with two non miscible liquid phases. Every container is entirely closed except for communicating holes in the wall separating every container from the preceding one and the following one. There may be one or several holes provided that the passage of a liquid through those holes, under a certain pressure, results on its division into fine droplets;

For every period of use are to be distinguished the stationary phase which remains in every container and the mobile phase which moves successively from one unit to the next one dispersing in the stationary phase and decanting at the other end of the unit and leaving it to enter the next unit and so on. The functions of the two phases may be exchanged at will by reversing the process.

The mobile phase is fed to the first unit under a given initial pressure. With every passage through a unit this pressure diminishes until the pressure is atmospheric at the outlet of the series. In that way an initial pressure source is used at the same time, for driving the mobile phase along and for spraying it through the stationary phase in a series which may include a great number of units.

Decantation of the emulsion so created takes place by gravity, the two liquids being of different densities. It may be assisted or not by mechanical devices or by physical or chemical means. In any case the spraying rate is regulated in such a way that it never becomes higher than the decanting rate in every unit.

Two important features of my invention are:

First: that the initial pressure assures both the flow and the spraying of the moving phase through the several units.

Secondly: that there is a steady equilibrium between spraying and decantation in every unit.

*Principle of counter-current extraction*

The purpose of this method is to transfer one or several solutes from one solvent to another, non miscible with the first. The aims of this procedure are the following:

Concentration of a dilute solution.

Partial or total purification of one or several extracts.

Partial or total purification of substances remaining in the raffinate.

Easier recovery of one or both solvents.

Easier subsequent separation of extract solutes or on the contrary of the raffinate solutes.

Ease of carrying out subsequent reactions for the preparation of the final product etc.

In the method according to my invention, all the units are filled with two liquid phases, which are the pure solvents. The solution to be treated is first introduced at one end of the series of units and the corresponding amount of solvent is recovered at the other end of the series or discarded. This operation is stopped shortly before the extract appears in the effluent. This time can be determined by a preliminary experiment or by calculation. Then the extraction or stripping solvent is fed in under pressure at the other end of the series and moves in the reverse direction to the initial solution. The effluent consists of this same solvent, enriched in extracted substances. The process is stopped at, or slightly before the time when the concentration of the extract commences to fall below the theoretical value corresponding to the balance of equilibrium between extract and the original solution. The feeding in of the original solution is then recommenced as before and the above procedure repeated periodically.

During every cycle, comprising a period of feed of original solution and a period of feed of the extraction solvent, the ratio of the volumes of the two solvents fed in should be inversely proportional to the partition ratio of the extractible solute in the two solvents, or of the least of the partition ratios if there is more than one substance to be extracted.

The process is continuous with alternative feed of raw solution and stripping solvent.

Extraction may be carried out at various temperatures to obtain solubilizing of a product of the material, to obtain any particular partition ratio, to avoid complete miscibility of the two solvents, or to obtain more steady phase equilibrium in such a way that a slight variation of composition or temperature will not cause any important variation of the respective volumes of the two phases.

The process is carried out with two mutually insoluble solvents, or with two solvents partially soluble in each other but not completely miscible, or again with a ternary, quaternary, or other mixture of solvents provided two phases can exist. The two feed liquids must then have essentially the composition of the two phases. Solid substances soluble in one or other of the two phases may be added for numerous purposes: to diminish or increase miscibility of the two phases, to favor dispersal or decantation or to alter the partition ratio of the extract. One special purpose would be to render certain substances soluble in a phase in which they are normally insoluble, or to separate the values of two partition ratios, for instance pH buffer can be used to separate substances with different ionisation constants, or optically active substance to separate isomers, or complex forming substances and so on.

Two or more sets or parts of the apparatus may be used simultaneously in series, operated with different pairs of solvents provided that two neighbouring series include one common phase or closely related phases e. g. as obtained by pH modification of the corresponding phase. This can result in two successive concentrations or an added purification or both together or different final products yielded by the different effluents.

The process can be made fully automatic, either by means of a timer which stops every feed when the calculated volume is reached, or even by means of an automatic control of effluents by colorimetry, potentiometry, conductometry, refractometry or any other appropriate physical or chemical device.

*Principle of counter current distribution*

The purpose of this method is to separate constituents of a solute mixture. It is a differential migration analysis method. It is applied for samples and therefore cannot be a continuous process, since the raw material feed is not continuous. It can lead to separate or purified materials of any number, but this result can only be obtained at the cost of sometimes excessive dilution.

In the herein described process the sample to be fractionated is introduced as a whole at the beginning of procedure into one unit or into a small number of neighbouring units in dissolved state, in the stationary phase. In the simplest case both phases, the stationary and the mobile one, keep the same functions during the whole procedure. The mobile phase is fed into the first unit filled with the raw solution and solutes exchange between the two phases to attain partition equilibrium. The mobile phase then carries through following units variable amounts of each material in the mixture according to their partition ratios and leaves a part of them in the stationary phase of the units. The moving speed of the maetrials is a result of the balance of two factors, first the transfer factor defined by their affinity for the moving phase, secondly the retarding factor defined as their affinity for the stationary phase, in other words the movement of a material is a function of the partition ratio of this material between the two phases.

Selectivity of separation is therefore controlled first by differences between partition ratios of the different materials in the two phases and can be modified by judicious choice of the solvents and secondly it is controlled by the number of sprayings of one phase in the second one or in other words by the number of units.

Temperature and solvent pair changes quoted in the extraction paragraph can be applied in the present procedure. Moreover the mobile phase may be gradually modified during the same operation to increase the transfer of the materials. Alterations in the composition of the mobile phase may even be sudden, provided that every mobile phase is miscible with the next one and that in each same the mutual solubility of the mobile phase and the stationary phase remains low.

Analysis results may be obtained either by collecting the effluent mobile phase with a fraction collector, or by separate emptying out of every unit both of the phases contained in its at the end of the procedure, or by the joint methods.

Counter current operation may be used at any period of the procedure. The primarily stationary phase then becomes the mobile phase and constitutes the effluent. This counter current feed may be continued until all the remaining extractible materials are removed from the apparatus. It can also be used to pass constituents with closely grouped partition ratios a number of times along the series of units by reversing the direction of flow every time the constituents come near the extremities of the series. By this method the group of constituents is subjected to a greater number of unit extractions; the selectivity of extraction is consequently increased.

In the case of two substances which are very difficult to separate, the system may be operated in a closed cycle after a preliminary normal operation. The effluent mobile phase is then fed back directly into the first unit and the procedure continued until maximum separation is obtained, i. e. until maximum concentrations of each substance are found in units which are separated by half the total number of units.

A method different from counter current extraction and from counter current distribution and consisting in counter current fractional extraction can also be carried out with the present device. It results in the separation by a continuous process of two closely related solutes or groups of them with slightly different partition ratios. Their separation would be impossible by the first method, because of the lack of selective solvent, and it would be very laborious by the second method of discontinuous sampling. In the counter current fractional extraction method there is a continuous feed of raw material into a unit near the center of the set, and a periodically alternating feed of two immiscible pure solvents at the opposite ends, as in the counter current extraction process. The volume ratio of the two phases passed through the system is regulated so that a hypothetical substance having a partition ratio intermediary between those of the two substances to be separated, would be distributed symmetrically in both directions from the feed point. Consequently each of the two substances or groups of substances will be found in the effluent partially or completely purified from the other components, but diluted in a volume of solvent dependent on the difficulty of separation. Still other processes can be operated with the same equipment, for example extraction with reflux on one or both sides.

In all these operations the solvent recovery is made by standard methods.

I will now describe two examples of my invention with reference to Figs. 1 to 4 of the drawings.

Fig. 1 shows a laboratory scale equipment for counter-current extraction.

It includes a column built up of several cylindrical units. Every unit is composed of a thick Pyrex glass cylindrical tube, closed at both ends by metal disks with plastic joint rings interposed. The metal disks are pierced with small diameter holes, permitting the flow and the dispersal of the mobile phase. Both ends of the column are fitted with terminal cylindric units fitted with pipe joints to link the column to the other parts of the equipment. The units are mounted each over another in a special frame not represented in the drawing. They are pressed together axially to assure pressure tightness. The column is connected to two reservoirs, the first one 6 contains the light liquid and it communicates by the pipe 7 with the lower end of the column. The second one, 8 is filled with the heavy liquid and it is in communication by the pipe 9 with the upper end of the column. These reservoirs are kept under pressure by means of compressed air 10. Two automatic three-way valves permit two combinations.

First, when valve 11 connects 8 to the upper end of the column valve 13 allows an affluent to reach outlet 14 during heavy phase flow.

Secondly, when valve 13 connects reservoir 6 to the lower end of the column valve 11 is opened toward the outlet 12 to allow light phase flow.

A timer or an automatic extract-detecting device controls the positon of the valves. When a timer is used light and heavy phase flow periods have to be regulated independently.

An important point of the construction is the choice of the material, the shape and the bore of the spray orifices. These orifices are exposed to wear and corrosion by various agents. All the orifices must have similar characteristics to ensure regularity of dispersal and decantation throughout the system. For a given form and volume of the unit compartments, the orifice must fulfill three conditions:

(1) Adequate dispersal in sufficiently fine droplets, 0.1 to 0.5 mm.

(2) Rate of flow adapted to rate of decantation in the unit.

(3) Operation at moderate pressure difference.

With short cylindrical orifices, the pressure necessary for good dispersal of usual solvents can hardly be lower than 100 g./cm.$^2$. With a pressure of this order of magnitude the rate of decantation in cylindrical units of 18 mm. diameter and 65 to 80 mm. height is about 10 ml./minute. One can use orifices of 0.25 mm. diameter to give this rate of flow. In a laboratory scale apparatus watch maker's rubies pierced with holes calibrated at ±0.01 mm. inserted in metal disks were found satisfactory. For larger units larger orifices can be used with the same pressure difference. The model described consists of 25 to 30 units and operated under an overall pressure of 3 kg./cm.$^2$.

Operation

For the sake of simplicity we will consider that the heavier phase in 8 contains solute to be extracted and that 6 contains the extracting solvent.

All the units are filled with the two pure solvents so that the interface is about the middle in each unit. The solution to be extracted is fed from 8 to the top of the top unit of the column and is dispersed in the extracting solvent by passing through the orifice. The solvent extracts a quantity of the dissolved substance and the heavy phase weaker in the solute passes into the next lower unit where the light solvent extracts a further amount of solute. The heavy solvent continues down the column becoming progressively weaker in the solute. The light solvent in the top unit becomes progressively richer in the solute until partition equilibrium is reached between the concentration of solute in the light solvent and its concentration in the feed liquor. After this condition is reached the light phase of the first unit cannot become further enriched in the solute and the feed solution passes inchanged into the second unit until a small number of the units, some 5 out of 25, has reached this limiting concentration. The lower units contain successively decreasing concentrations of solute until at the bottom unit the concentration is negligible. The heavy solvent discharging from 14 is so far free from solute. There is thus no loss of solute. If feed were continued as above, the heavy phase discharged could eventually entrain some solute. The automatic valve actuated by the timer now shuts off the feed from 8 to the top and admits exterator solvent from 6 to the bottom of the lowest unit in the series, where it is dispersed into the heavy phase. As the flow of light solvent continues up along the column, the light solvent becomes progressively enriched in solute. During this stage the effluent from the top of the column at 12 consists of the light solvent containing maximum equilibrium concentration of solute. This continues for the time necessary to discharge all the light solvent which had reached equilibrium concentration and is stopped before the decrease in concentration becomes appreciable. The feed of solution to be extracted is then recommended to the top of the column. This cycle of operations can be continued indefinitely. With a sufficient number of units and with careful operation, losses are nil, and the effluent always contains maximum equilibrium concentration of solute. In this case $$V_a C_a = V_b C_b$$

plus $$\frac{V}{V_b} = \frac{C}{C_a}$$

and $$\frac{C_b}{C_a} = \frac{1}{k}$$

where $V$=volume; $C$=concentration; $K$=partition ratio. Subscript $a$=feed solution; $b$=extract solution. If this is exact the ratio of the volume of the two solvents should be the inverse of the partition ratio of the solute in the two solvents. If the proportion of extract solution is lower than this, losses will no longer be nil; if greater losses will be nil but the same quantity of substance will be dissolved in a volume of solvent greater than necessary.

In this discussion it is assumed that the volumes of the two phases remained constant, that is, that the two solvents have previously been saturated with each other or that their mutual solubility is negligible. It is also assumed that the solute to be extracted is present in reasonably low concentration and does not significantly modify the equilibrium of the two solvents in the pure state.

The extractor units may be of any size and shape, and may be assembled in any way. They may be separated one from another or grouped in columns by any number, the columns being linked in series by pipe-work, so as to be adapted to particular conditions or to the space available. They may be constructed of any material which is resistant to the pressure employed and to the action of liquids and substances to be treated.

The material, shape and bore of the dispersing orifices as well as the number of them in each unit may be of any kind, provided that they conform to the conditions laid down above. They may be notably of ruby, glass, metal, metal carbides, either circular or not or of a form designed to produce turbulence. They may be fitted with a taper needle adjustable from the exterior so as to obtain the best results. They may be symmetrical or not with respect to the direction of flow. They may consist of some porous material.

The decantation may or may not be assisted by any device such as a jet breaker plate, baffle in wire gauze or other material, packing rings or a diaphragm in porous material selectively wetted by either phase etc.

All or a part of the units can include any additional device, for instance overflow tubes, emptying or filling pipes, speed regulating devices, etc.

The overall pressure can have any value, provided it is expended stepwise in two or more successive stages. It can be produced in any convenient way by liquid pumps, air compressor, compressed gas reservoir or other compressed air supply.

Figure 2:
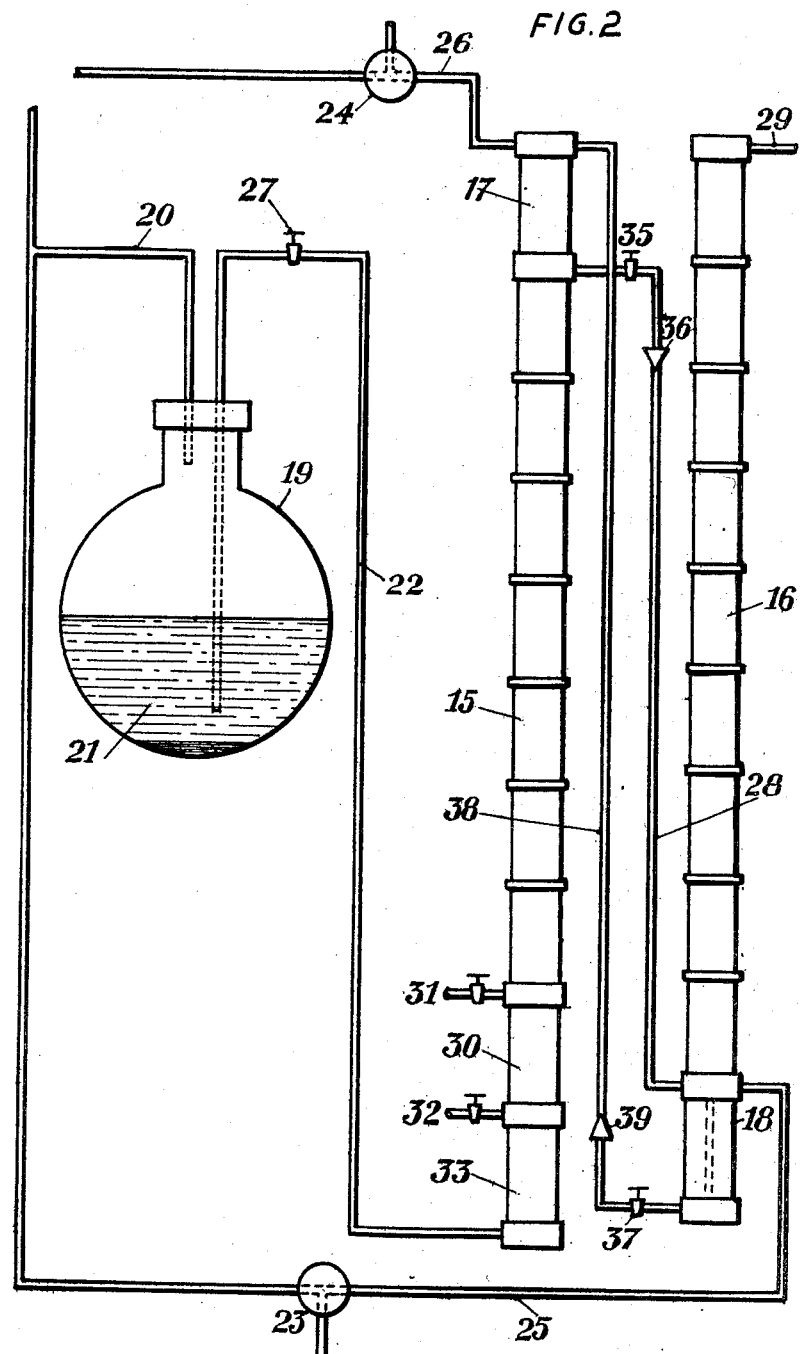

The control of the operation can be automatic or not. Figure 2 shows a laboratory scale apparatus for the countercurrent distribution. Two colums are represented 15 and 16. The units composing these columns are identical in shape, size, material and in all particulers to the ones described in the counter-current extraction diagram and will not be described again. Their assembly is made in the same fashion. Only the number and disposal of pipe joint pieces are different of the extraction column. The more important of them are shown in Figs. 3 and 4 in some detail. Their mode of junctioning will be described in operation paragraph.

The number of units is assumed to be so high, that the available pressure cannot provoke a good dispersal in all of them, when connected in a single series. Therefore the units are grouped in two separate series, each of them being represented by a column in the diagram. In each series, the pressure varies from the initial value to atmospheric pressure from the first unit to the last of the series. In this laboratory apparatus, using compressed air as the motive force, this two series disposition requires the periodic transfer of the mobile phase from the end of the first series to the head of the second one, i. e. from a point under atmospheric pressure to a point under maximal pressure. Units 17 and 18 are concerned with this transfer rather than with extraction process.

The reservoir 19 is kept under pressure by means of compressed air from 20. It contains the mobile phase 21 assumed to be the light liquid. Solvent feed enters the first column through the pipe 22. The effluent of the second column at 29 is collected in separate fractions preferably by an automatic fraction collector. The fraction collector is operated by a timer. Fraction collector and timer are not represented.

The same timer operates two automatic three-way valves 23 and 24 on the compressed air supply pipes 25 and 26. 23 has to keep under pressure the first unit of the second column, during mobile phase flow and has to release this pressure periodically to allow the transfer from 17 to 18. Similarly 26 keeps 17 under atmospheric pressure during flow and admits periodically the high pressure to operate transfer from 17 to 18.

*Operation*

The apparatus is filled with the two solvent phases in such a way that each unit contains an equal volume of each phase. To do this, solvent reservoir 19 containing the two phases is put under pressure. By regulating the depth of the tube dipping into the liquid in the reservoir so that its outlet is in the lower layer of liquid, the necessary volume of the heavy liquid, or a slight excess, is forced into the columns. The columns are then held horizontally, while light solvent is forced in by raising the tube into the upper layer in the reservoir until no more solvent can be introduced. As the columns are now horizontal the heavy solvent distributes itself uniformly, occuping half the volume of each unit, up to the level of the orifice. Surplus heavy solvent is discharged at the ends of the columns opposite to the feed end. The columns are now returned to the vertical position and entry of light solvent continues until all the air bubbles are evacuated from the columns. Each unit now contains an equal volume of heavy and light phase. Valve 27 is now closed and compressed air is introduced into 17 by pipe 26 until all the liquid of this unit is forced on by pipe 28 into 18. A corresponding volume of liquid is discharged and recovered at pipe 29. The automatic valve 24 connected to 17 is put under atmospheric pressure. By opening cocks 31 and 32, unit 30 is emptied of liquid. The mixture to be distributed is now rapidly introduced into 30 and the cocks 31 and 32 closed off. Cock 27 is now opened and the timer operating the automatic valves and the fractions collector is put working. From this stage on the operation of the apparatus is automatic. The mobile phase is dispersed into unit 33 and completed if necessary equilibrium with the stationary heavy phase. It passes into unit 30 and transfers the solutes into the following units at a rate proportional to the respective partition ratios in the two solvents. After a few minutes working, unit 17 becomes filled with mobile phase while unit 18 is emptied through 34, diagram 4, into the next higher unit. At the same time, an equal volume of mobile phase is discharged through pipe 29 into one of the collecting tubes. When this happens, the timer operates to bring the next collector tube into position, and actuates the automatic valves 24 which admits compressed air into the unit 17 and also the automatic valve 23 which releases the pressure from unit 18. The contents of unit 17 is thus transferred by pipe 28 into 18 in a few seconds. Then the automatic valves return to their former position and the circulation of mobile phase recommences in the columns.

Reflux from 18, which is under pressure, to 17, which is at atmospheric pressure, is prevented by the check valve 36. During all this operation cock 37 is closed and tube 38 does not operate.

The process continues indefinitely and may result in the complete removal of all the solute from the columns into the fraction collector tubes.

If counter-current operation is desired or if it is desired to make the heavy solvent the mobile phase, heavy solvent is introduced under pressure through pipe 29, cock 35 is closed and cock 37 is opened. The role of elements 17 and 18, tubes 28 and 38, and check valves 36 and 39 automatic valves 23 and 24 is then reversed. The effluent from 33 is sent to the fraction collector.

The working of the apparatus remains automatic until a further reversal of the direction of flow is desired.

The apparatus may comprise or not an automatic fraction collector. For example, when an analysis or control and not a preparation of pure fractions is desired the analysis may be carried out continuously and automatically on the effluent at 29, by means of an electrical or optical device to record a distribution diagram. In this case, fraction collector is useless.

The apparatus can be coupled with any solvent recovery or extract concentrating equipment either at the final product stage or between two extraction processes. This equipment can be made automatic or not, it can operate continuously or discontinuously.

The apparatus described has numerous advantages over existing equipments, for instance its limited encumbrance, low cost construction and operation and versatility. Operation is rapid and fully automatic. The number of units can be increased to satisfy any requirement. The absence of any mechanically mobile device, except control devices, secures minimal power requirement and renders the operation entirely safe.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An apparatus of the type described which comprises, in combination, a multiplicity of closed containers in series, means for placing the bottom of every container in communication with the top of the next one, each of said communication means forming at least one passage and each of the passages formed by said communication means being of very small cross-section to reduce into fine droplets a liquid forced therethrough under pressure, said cross-section being small enough to prevent any appreciable flow of liquid through said passages under the mere effect of gravity, the respective lower portions of said containers being filled with a first solvent and the remainder of the spaces inside said containers being filled with a second solvent of a density lower than that of said first solvent, said two solvents being substantially immiscible, means for continuously feeding to one of the end containers of said multiplicity of containers, under a pressure of the order of magnitude of 100 grams per square centimeter multiplied by the number of containers of said multiplicity of containers, a stream of one of said two solvents, means for closing off all communication between said end container and the outside of the apparatus other than said feeding means, said end container being the one where the portion thereof in communication with the next container contains the fed solvent, outlet means opening from the portion of the other end container where is located said feed solvent, means for closing off all communication between said second end container and the outside of the apparatus other than said outlet means, whereby a stream of said fed solvent flows through said multiplicity of said containers and said communication means from the first end container to the second end container whereas the other solvent does not circulate from one container to the next one during circulation of said fed solvent.

2. An apparatus of the type described which comprises in combination, a multiplicity of closed containers disposed in series above one another, the top and bottom ends of every container being constituted by plates provided each with at least one orifice to connect said container with those located above and below it respectively, all of said holes being of very small cross section to reduce into fine droplets a liquid forced therethrough under pressure, said cross section being small enough to prevent any appreciable flow of liquid through said passages under the mere effect of gravity, the respective lower portions of said containers being filled with a solvent and the remainder of the spaces inside said containers being filled with another solvent of a density lower than that of the first mentioned solvent, said two solvents being practically non-miscible in each other, a conduit opening into the top end of the top container of said series, said conduit constituting the only communication between said top container and the outside of the apparatus, a tank containing the solvent of higher density, means for applying inside said tank a pressure of the order of magnitude of 100 gr. per sq. cm. multiplied by the number of containers of said multiplicity of containers, valve means for connecting said conduit either with the bottom part of said tank or with the outside, a conduit opening into the bottom end of the bottom container of said series, said conduit constituting the only communication between said bottom container and the outside of the apparatus, a tank containing the solvent of lower density, means for applying inside said last mentioned tank a pressure of the order of magnitude of 100 gr. per sq. cm. multiplied by the number of containers of said multiplicity of containers, and valve means for connecting said last mentioned conduit either with the said bottom part of said last mentioned tank or with the outside of the apparatus, said two valve means being adapted to connect one of said conduits with the corresponding tank when the other conduit is connected with the outside and inversely.

3. An apparatus of the type described which comprises, in combination, two columns each constituted by a multiplicity of closed containers disposed in series above one another, the top and bottom ends of every container being constituted by plates provided each with at least one orifice to connect said container with those located above and below it respectively, all of said holes being of very small cross section to reduce into fine droplets a liquid flowing therethrough, the respective lower portions of said containers being filled with a solvent and the remainder of the spaces inside said containers being filled with another solvent of a density lower than that of the first mentioned solvent, said two solvents being practically non-miscible in each other, a tank containing a solvent, a conduit interposed between the bottom of said tank and the bottom of one of said columns, said conduit forming the only communication between said last mentioned column bottom and the outside of the apparatus, a conduit interposed between the upper part of said column and the lower part of the other one, three compressed air feed conduits, opening respectively into the top of said tank, the top of said first mentioned column and the lower part of said second mentioned column, valve means mounted in said conduits, the valve means in the two last mentioned conduits being adapted to connect said top of said first mentioned column and said lower part of said second mentioned column with the atmosphere and a conduit forming the only communication between the top of the second mentioned column and the outside of the apparatus.

References Cited in the file of this patent
UNITED STATES PATENTS

| | | |
|---|---|---|
| 1,967,798 | Witte | July 24, 1934 |
| 1,981,818 | Whitner, Jr. | Nov. 20, 1934 |
| 2,011,186 | Van Dijcks | Aug. 13, 1935 |
| 2,144,797 | Dons et al. | Jan. 24, 1939 |
| 2,662,001 | Burns et al. | Dec. 8, 1953 |